(12) United States Patent
Bhalla et al.

(10) Patent No.: US 6,327,059 B1
(45) Date of Patent: Dec. 4, 2001

(54) OPTICAL SIGNAL PROCESSING MODULES

(75) Inventors: Kulbir S. Bhalla, Red Bank; Albert M. Gottlieb, Maplewood, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/098,568

(22) Filed: Jun. 17, 1998

(51) Int. Cl.[7] .................................................. H04B 10/00
(52) U.S. Cl. ............................................. 359/109; 359/110
(58) Field of Search ................................... 359/163, 109, 359/349, 110, 124, 127, 128; 385/73, 75, 92, 14, 134, 24

(56) References Cited

U.S. PATENT DOCUMENTS

| | | | |
|---|---|---|---|
| 5,194,977 | * | 3/1993 | Nishio .................................. 359/128 |
| 5,546,281 | * | 8/1996 | Poplawski et al. .................... 361/752 |
| 5,594,821 | * | 1/1997 | Cheng ..................................... 385/24 |
| 5,642,447 | * | 6/1997 | Pan et al. ................................ 385/81 |
| 5,712,942 | * | 1/1998 | Jennings et al. ...................... 385/134 |
| 5,953,142 | * | 9/1999 | Chiaroni et al. ...................... 359/127 |
| 5,959,767 | * | 9/1999 | Fatehi et al. .......................... 359/341 |
| 6,008,934 | * | 12/1999 | Fatehi et al. .......................... 359/341 |
| 6,011,623 | * | 1/2000 | MacDonald et al. ................. 356/519 |
| 6,011,645 | * | 1/2000 | Hong ..................................... 359/341 |

* cited by examiner

*Primary Examiner*—Leslie Pascal
*Assistant Examiner*—Christina Y Leung
(74) *Attorney, Agent, or Firm*—Baker & McKenzie

(57) ABSTRACT

An optical signal processing circuit including one or more modules. Each module performs a particular optical signal processing function such as filtering, switching, multiplexing/demultiplexing, monitoring or amplifying one or more optical signals. The modules can be combined to form a wide variety of optical signal processing circuits and systems.

9 Claims, 3 Drawing Sheets

OPTICAL SIGNAL PROCESSING MODULES

FIELD OF THE INVENTION

The present invention relates to the field of optical networking, in particular to devices for processing optical signals.

BACKGROUND OF THE INVENTION

In the use of optical signals to convey information in telecommunications networks, there are several optical signal processing functions that are typically performed at various points in a network, such as signal amplification, multiplexing/demultiplexing, filtering and switching.

In known optical communications systems, functions such as the aforementioned, are typically performed by specialized hardware arrangements comprised of often large numbers of discrete optical components. In complex systems, large collections of such arrangements can become physically quite large. Furthermore, such systems are subject to substantial signal losses due to long runs of fiber to interconnect the discrete components and due to losses at each of a large number of component interconnections. Other problems include fragility, greater susceptibility to environmental conditions, a greater effort and cost to assemble and difficulty in testing.

Moreover, due to the specialized nature of each circuit comprised of discrete components, modification of such circuits and the replacement of failed individual components is often difficult.

SUMMARY OF THE INVENTION

The present invention provides optical modules for use in optical signal systems which overcome the shortcomings of known optical systems. The present invention also provides an optical signal processing system comprising a plurality of optical modules.

In a first exemplary embodiment of an optical module in accordance with the present invention, a plurality of optical channels are each tapped and split into two signals. One signal is used internally in the module for monitoring purposes, and the second signal is provided externally.

In a second exemplary embodiment of an optical module in accordance with the present invention, optical pump power is added to each of a plurality of optical channels using wavelength division multiplexing (WDM) couplers and then amplified.

In a third exemplary embodiment of an optical module in accordance with the present invention, a plurality of optical channels are passed through a bandpass filter to remove noise and/or other unwanted signals. Each filtered signal is tapped and the plurality of tapped signals are combined and provided externally, as are the filtered signals.

The modules of the present invention can be used in a wide variety of arrangements and applications. For example, the same type of module can be used in a downstream circuit as well as an upstream circuit. By thus providing functions which can be used in a wide variety of applications, the modules of the present invention readily lend themselves as building blocks for more complex systems. As such, a small number of module types can be used to build highly complex systems.

In an exemplary embodiment of an optical telecommunications arrangement in accordance with the present invention, the aforementioned optical modules are arranged in an optical circuit between client interface (CI) inputs and the backplane of an optical switching system. The exemplary optical circuit provides multiplexing, monitoring, amplification and filtering functions.

In a further exemplary embodiment of an optical telecommunications arrangement in accordance with the present invention, the aforementioned optical modules are arranged in an optical circuit between an optical switching system and CI outputs. As with the first embodiment, this circuit performs demultiplexing, monitoring, amplification and filtering functions.

DETAILED DESCRIPTION OF THE INVENTION

Figure 1:
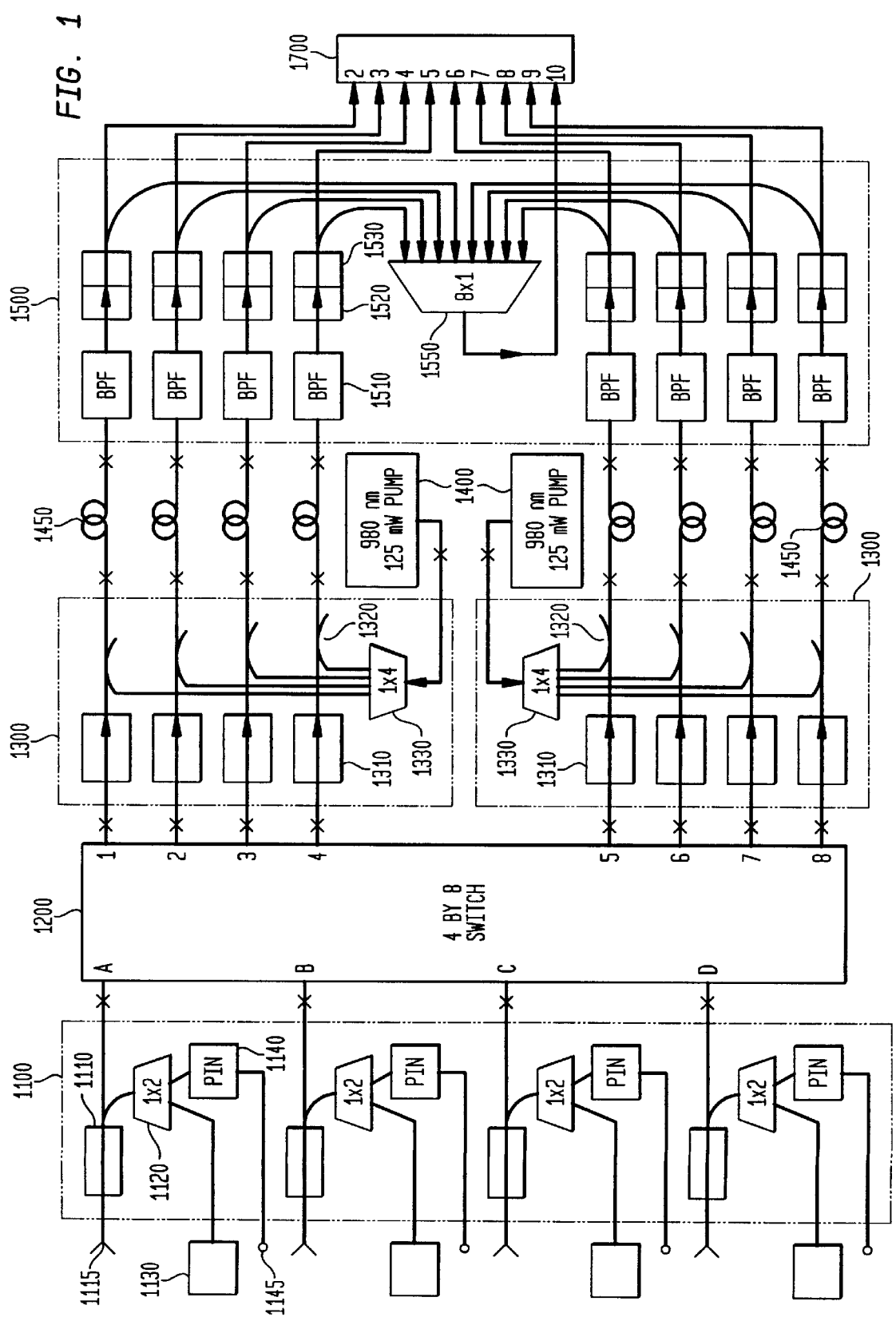
FIG. 1 is a block diagram of a first exemplary arrangement of optical modules in accordance with the present invention.

FIG. 1 shows an exemplary embodiment of a first optical circuit 1000 in accordance with the present invention. The optical circuit 1000 provides an optical path between client interface (CI) inputs and an optical switching system (not shown). Each CI input can carry optical signals of any one of a plurality (e.g., eight) of distinct, predetermined wavelengths, such as the wavelengths used in a Multiwavelength Optical Network (MONET). The circuit 1000 provides a plurality of outputs (e.g., eight) with each output carrying optical signals of one of the plurality of distinct, predetermined wavelengths. The optical circuit 1000 performs multiplexing, monitoring, switching, amplification and filtering functions which will be described more fully below.

Figure 2:
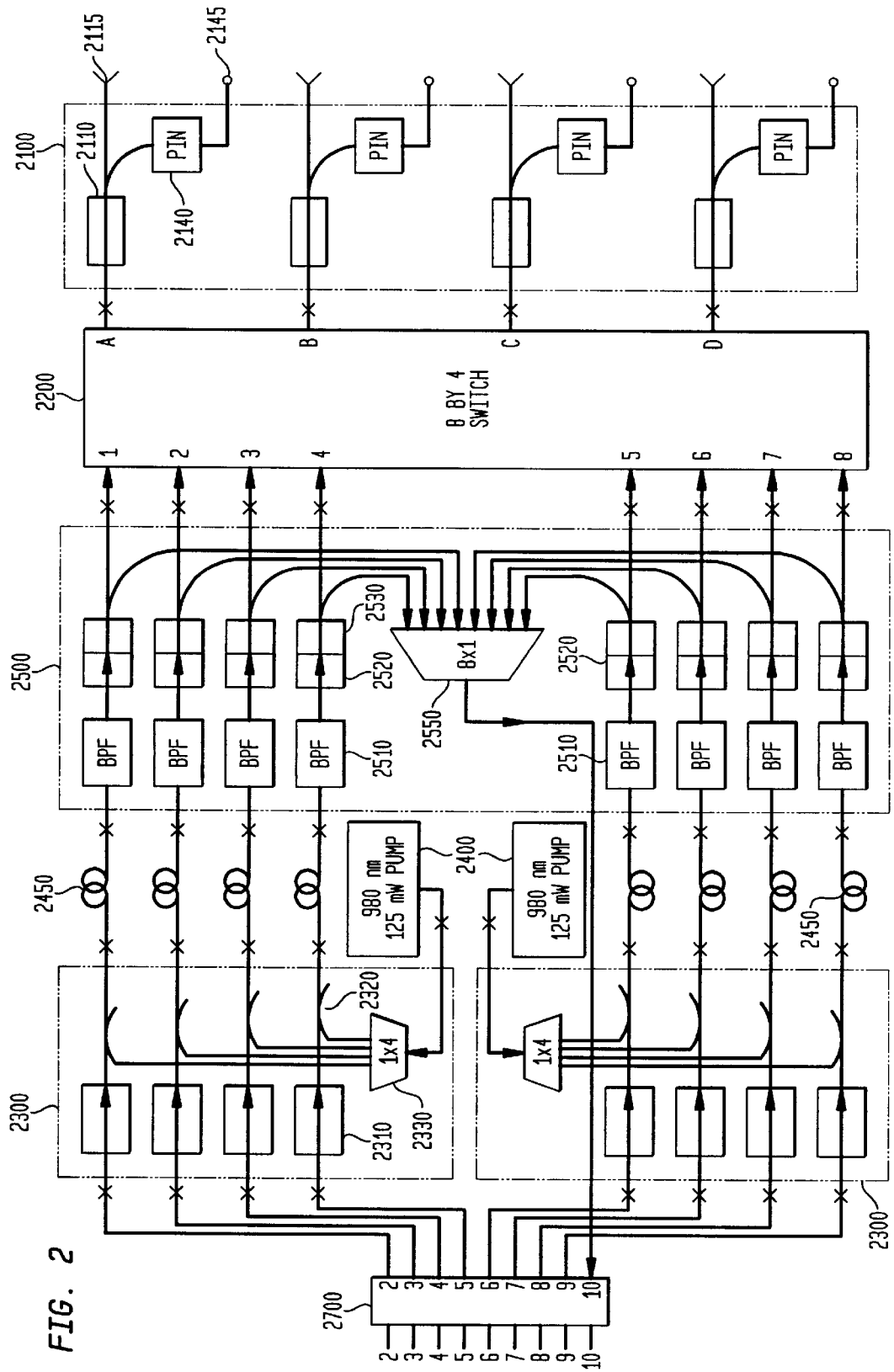
FIG. 2 is a block diagram of a second exemplary arrangement of optical modules in accordance with the present invention.

FIG. 2 shows an exemplary embodiment of a second optical circuit 2000 in accordance with the present invention. The optical circuit 2000 provides an optical path between an optical switching system (not shown) and CI outputs. The circuit 2000 has a plurality of inputs from the switching system, each input carrying optical signals of one of the plurality of distinct, predetermined wavelengths, and provides the optical signals to the CI outputs. Like the optical circuit 1000, the optical circuit 2000 performs demultiplexing, monitoring, switching, amplification and filtering functions which will be described more fully below.

The optical circuit 1000 comprises a tap-splitter array module 1100, a 4×8 optical switch 1200, two splitter-isolator modules 1300, each coupled to a pump 1400, a filter array module 1500 and a connector 1700.

In the exemplary embodiment of FIG. 1, the tap-splitter array module 1100 comprises four optical signal inputs each coupled to a tap 1110 which splits the respective input signal into two signals. The input signals are provided via connectors 1115 coupled to the signal inputs of the module 1100. The connectors 1115 can be angle polished connectors. 10% taps can be used for the taps 1110 (i.e., 90% of the input power is passed through and 10% is tapped-off) although taps with other ratios can be used as well, such as 5% or 4% taps. The main output of each tap 1110 is provided as an output of the module 1100 and the tap output of each tap 1110 is coupled internally to a splitter 1120. 1×2 3 dB splitters can be used for the splitters 1120. One output of each splitter 1120 is coupled to an optical connector 1130 on the module 1100. This provides four optical outputs which can be used to monitor the four CI input signals applied to the module 1100. The connector 1130 can be a multi-fiber MTP connector available from U.S. Connect, Inc.

Another output of each splitter 1120 is coupled to a photodiode 1140 whose output is coupled to an electrical connector or connectors 1145 on the module 1100. This provides four electrical outputs, in addition to the four optical outputs at the connector 1130, which can be used to monitor the four optical CI input signals applied to the module 1100.

The main outputs of the taps 1110 are coupled to outputs of the module 1100 and provided to inputs of a 4×8 switch 1200. Such a switch is available from Lucent Technologies, Inc. The 4×8 switch has four inputs (A through D) and eight outputs (1 through 8) and can route a signal at any input to any output. Each output of the switch 1200 is coupled to an optical path which is adapted to process signals of one of eight predetermined wavelengths, as described below. Each of the four CI inputs may carry optical signals of one of the eight predetermined wavelengths. Depending on the wavelength of the signals that are to be applied to each CI input of the module 1100, the switch 1200 is configured accordingly to connect each of the corresponding switch inputs (A–D) to the appropriate output (1–8).

It should be noted that although in the exemplary embodiment of FIG. 1 a n×2n switch is used, a 2n×2n switch can also be used, e.g., an 8×8 switch. In the latter case, two four-channel modules 1100 can be used on the input side or one eight-channel tap-splitter module (not shown) with similar functionality as the module 1100, can be used.

The eight outputs of the switch 1200 are coupled to two splitter-isolator modules 1300, with each module handling four optical channels. Each splitter-isolator module 1300 comprises four isolators 1310, one for each input. Each isolator 1310 is coupled to a WDM coupler 1320. Each WDM coupler 1320 of each module 1300 is coupled to an output of a 1×4 splitter 1330 which has an input coupled to the output of a pump 1400. In the exemplary embodiment shown in which the wavelengths of the optical signals processed are approximately 1550 nm, each coupler 1320 can be a 980/1550 WDM coupler and each pump 1400 can be a 125 mW pump emitting light with a wavelength of 980 nm.

The WDM couplers 1320 couple the output of each pump into the four optical channels handled by each module 1300. The isolators 1310 prevent the coupled pump signal from traveling upstream. In the exemplary embodiment described, each isolator typically provides 45 dB of isolation. Each of the four outputs of each module 1300 can be coupled to a length of Erbium Doped Fiber (EDF) 1450 which can be coupled in turn to one of eight inputs of the filter array module 1500. Each length of fiber 1450 can be comprised of E030 fiber with an approximate length of 25 m.

The fibers 1450 in conjunction with the pumps 1400 and WDM couplers 1320 form erbium-doped fiber amplifiers (EDFA) which act to amplify the signals on each of the eight optical channels. The input signals at the CI inputs typically have been attenuated and are further attenuated by the switch 1200 and should be amplified before being provided to the switching system backplane (at the connector 1700). In an exemplary application, the input signals typically have a power level of −5 to 0 dBm, whereas the backplane signal level should be approximately 7 dBm.

The amplified optical signals are then passed through band pass filters (BPF) 1510 in the module 1500. The BPFs 1510 can be implemented in a known way using thin-film technology and preferably have a flat pass-band with sharp cut-off characteristics. Each of the eight BPFs 1510 has a different pass-band center wavelength which corresponds to one of the eight wavelengths of the optical signals to be processed (e.g., 1549.315, 1550.918, 1552.524, 1554.134, 1555.747, 1557.363, 1558.983 and 1560.606 nm). The output of each BPF 1510 is coupled to an isolator 1520 which is in turn coupled to a tap 1530. The isolators 1520 prevent light from propagating upstream from the outputs of the module 1500. It should be noted that the order of the isolators 1520 and the taps 1530 can be reversed; i.e., the taps 1530 can be arranged between the isolators 1520 and the BPFs 1510. Each tap 1530 has a tap output which is coupled to an input of an 8×1 combiner 1550. The 8×1 combiner 1550 has an output which is coupled to a pin of the connector 1700 and thus allows optical monitoring of the signals in all eight of the optical paths after the BPFs 1510. The main output of each tap 1530 is coupled to a connector 1700. In the exemplary embodiment of FIG. 1, the connector 1700 is a 12-fiber, MTP backplane connector.

The circuit 2000 of FIG. 2 is similar to the circuit of 1000 and includes similar components, although arranged substantially in reverse to the arrangement of the circuit 1000. The circuit 2000 comprises a connector 2700, similar to the connector 1700; two splitter-isolator modules 2300, each coupled to a pump 2400, similar respectively to the modules 1300 and pumps 1400; a filter array module 2500, similar to the filter array module 1500; an 8×4 optical switch 2200; and a tap-splitter array module 2100, similar to the module 1100.

As shown in FIG. 2, the connector 2700 has eight pins coupled to inputs of the two splitter-isolator modules 2300. The outputs of the modules 2300 are coupled via EDF fiber 2450 to the filter inputs of the filter array module 2500. The signal outputs of the module 2500 are coupled to inputs of the 8×4 switch 2200. As with the module 1500, the module 2500 also provides a combined output signal which is coupled to a pin of the connector 2700. The 8×4 switch 2200 has eight inputs (1 through 8) and four outputs (A through D). Each of the four outputs of the 8×4 switch 2200 is coupled to an input of the tap-splitter array module 2100 which includes four taps 2110 coupled to the inputs of the module 2100. The main outputs of the taps 2110 are provided as outputs 2115 of the module 2100 while the tap outputs of the taps are coupled internally to photo diodes 2140. The outputs of the photodiodes 2140 are coupled to a connector or connectors 2145 which allow external electrical monitoring of the optical signals provided to the module 2100.

Figure 3A:
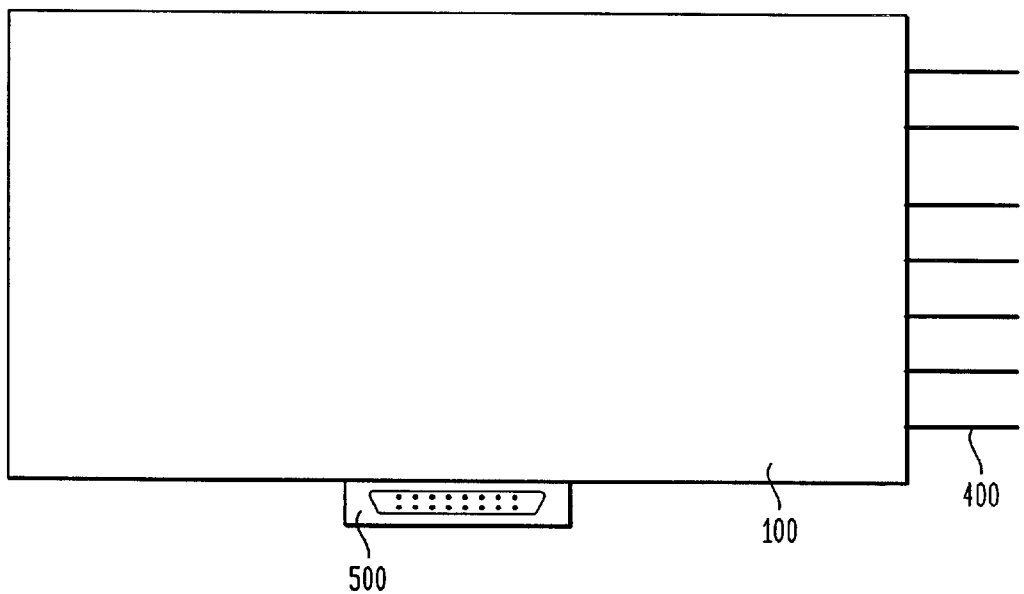
FIGS. 3A and 3B show top and side views of an exemplary package of an optical module in accordance with the present invention.
Figure 3B:
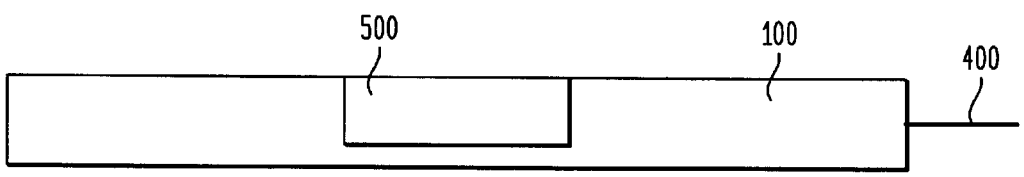

FIGS. 3A and 3B show top and side views, respectively, of an exemplary package 100 for an optical module in accordance with the present invention. In particular, the packaging shown can be used for the tap-splitter array module 1100 (or 2100) and includes a multi-pin electrical connector 500 which provides external connections to the photodiodes 1140 (or 2140). The connector 500 can be a 16-pin, 90-degree header-type connector. This configuration allows a signal evaluation circuit pack, or printed wiring board, to be piggy-backed onto the module package. In the case of the switches 1200 and 2200, for example, electrical connectors may be provided on their packages in order to provide control signals for configuring the switch connections.

The package 100 additionally has optical connections 400 for optically coupling to other modules. The optical connections 400 may comprise optical fiber which can be spliced with other optical fiber or may comprise optical connectors. Optionally, the package may also include an MTP connector to provide external connectivity for optical monitoring outputs, as described above.

In an exemplary embodiment, the module package 100 has external dimensions of approximately 152 mm×80 mm×12 mm.

It should be evident in light of the disclosure provided herein that several variants of the circuits and modules of the present invention are possible. For example, the two laser pumps 1400 and n-channel splitter-isolator modules 1300, 2300 of each circuit can be replaced with one laser pump and one 2n-channel splitter-isolator module. Furthermore, each 2n-channel filter module 1500, 2500 can be replaced with two n-channel filter modules.

What is claimed is:

1. An optical signal processing module comprising:
    a package;
    a plurality of optical inputs and outputs, wherein the plurality of optical inputs and outputs are provided on the package; and
    a plurality of optical signal processing components, wherein the plurality of optical signal processing components include:
        a first filter, the first filter having an input coupled to a first optical input of the module and having an output;
        a second filter, the second filter having an input coupled to a second optical input of the module and having an output;
        a first tap, the first tap having an input coupled to the output of the first filter, having a first output and having a second output;
        a second tap, the second tap having an input coupled to the output of the second filter, having a first output and having a second output;
        a first isolator, the first isolator having an input coupled to the first output of the first tap and having an output coupled to a first optical output of the module;
        a second isolator, the second isolator having an input coupled to the first output of the second tap and having an output coupled to a second optical output of the module; and
        a combiner, the combiner having a first input coupled to the second output of the first tap, having a second input coupled to the second output of the second tap and having an output coupled to a third optical output of the module,
    wherein the plurality of optical signal processing components are contained in the package and are coupled to the plurality of optical inputs and outputs.

2. The module of claim 8, wherein the plurality of optical signal processing components further include:
    a tap, the tap having an input coupled to an optical input of the module, a main output coupled to a first optical output of the module and a tap output;
    a splitter, the splitter having an input coupled to the tap output of the tap, a first output coupled to a second optical output of the module and a second output; and
    a photodiode, the photodiode having an input coupled to the second output of the splitter and an output coupled to an electrical output of the module.

3. The module of claim 8, wherein the plurality of optical signal processing components further include:
    an isolator, the isolator having an input coupled to a first optical input of the module and an output; and
    a coupler, the coupler having a first input coupled to the output of the isolator, a second input coupled to a second optical input of the module and an output coupled to an optical output of the module.

4. The module of claim 3, wherein the coupler includes a wavelength division multiplexing coupler.

5. The module of claim 1, wherein the plurality of optical signal processing components further include:
    a first isolator, the first isolator having an input coupled to a first optical input of the module and having an output;
    a second isolator, the second isolator having an input coupled to a second optical input of the module and having an output;
    a first coupler, the first coupler having a first input coupled to the output of the first isolator, having a second input and having an output coupled to a first optical output of the module;
    a second coupler, the second coupler having a first input coupled to the output of the second isolator, having a second input, and having an output coupled to a second optical output of the module; and
    a splitter, the splitter having a first output coupled to the second input of the first coupler and a second output coupled to the second input of the second coupler and having an input coupled to a third optical input of the module.

6. The module of claim 1, wherein the plurality of optical signal processing components further include:
    a filter, the filter having an input coupled to an optical input of the module and having an output;
    an isolator, the isolator having an input coupled to the output of the filter and having an output; and
    a tap, the tap having an input coupled to the output of the isolator, having a first output coupled to a first optical output of the module and having a second output coupled to a second optical output of the module.

7. The module of claim 1, wherein the plurality of optical signal processing components further include:
    a filter, the filter having an input coupled to an optical input of the module and having an output;
    a tap, the tap having an input coupled to the output of the filter, having a first output coupled to a first optical output of the module and having a second output; and
    an isolator, the isolator having an input coupled to the second output of the tap and having an output coupled to a second optical output of the module.

8. The module of claim 1, including an electrical connector for coupling the module to an external circuit.

9. The module of claim 8, wherein the module can be mounted on a circuit board.

* * * * *